United States Patent [19]

O'Leary et al.

[11] Patent Number: 5,867,162
[45] Date of Patent: Feb. 2, 1999

[54] METHODS, SYSTEMS, AND COMPUTER PROGRAM PRODUCTS FOR CONTROLLING PICKLISTS

[75] Inventors: Daniel J. O'Leary, Mountain View; Robin Jeffries, Palo Alto, both of Calif.

[73] Assignee: Sun Microsystems, Inc., Palo Alto, Calif.

[21] Appl. No.: 759,694

[22] Filed: Dec. 6, 1996

[51] Int. Cl.$^6$ ...................................................... G06F 15/00
[52] U.S. Cl. ........................................... 345/352; 345/353
[58] Field of Search ....................................... 345/352, 353

[56] References Cited

U.S. PATENT DOCUMENTS 5,664,146   9/1997   Bolin et al. .............................. 711/115

Primary Examiner—Ba Huynh
Attorney, Agent, or Firm—Robert P. Sabath

[57] ABSTRACT

Methods, and systems, and computer program products for displaying and editing picklists in a drop-down menu of a graphical user interface (GUI) of a computer. The drop-down menu allows a user to see a list of entries in a picklist section and to select an option to remove entries from the picklist section, to minimize clutter. The picklist section filters out redundant entries which are similar though not textually equivalent, to eliminate confusion in file lists and lists of recently used e-mail.

8 Claims, 8 Drawing Sheets

METHODS, SYSTEMS, AND COMPUTER PROGRAM PRODUCTS FOR CONTROLLING PICKLISTS

CROSS-REFERENCE TO RELATED APPLICATIONS

Related applications include "METHODS, SYSTEMS, AND COMPUTER PROGRAM PRODUCTS FOR STORING, LOADING, ANALYZING AND SHARING REFERENCES TO RECENTLY USED OBJECTS," to Daniel J. O'Leary and Robin Jeffries, U.S. patent application Ser. No. 08/761,546; and "THIRD-PARTY TOOL INTEGRATION," to Daniel J. O'Leary and David A. Nelson-Gal, U.S. patent application Ser. No. 08/761,547, each filed concurrently on even date with the present application, the contents of both thereof are expressly incorporated herein in their entirety by reference.

FIELD OF THE INVENTION

The present invention relates to improved systems, methods, and computer program products relating to displaying to computer users a series of choices in a picklist of a drop-down menu.

BACKGROUND OF THE INVENTION

Various applications remember recently used files. For example, word processors such as WordPerfect for Windows remember a limited number of recently used files that have been opened or saved. The names of prior opened files are added at the end of a drop-down menu such as the File menu associated with the name "File" on a horizontal bar of the main application window in WordPerfect for Windows. This is a short-hand way of showing the user certain used files which now can be reopened and reaccessed by electing (as by single or plural mouse clicking for example) an entry in the menu corresponding to the file name. The order and content of lists of recently used files are controlled by the application, e.g., the word processor, and, in some applications, the order of the list of recently used files is updated as a less recently used file is used after using a more recently used file. However, known applications do not include a user-controllable mechanism for specifying that entries in the list should be removed.

Also, for some lists of fixed maximum sizes, when a list is full, the addition of a new file to the list causes the least recently used file in the list to be removed from the list to make room for the new file, and the order of the list is updated to make the most recently used file appear first on the list. However, known applications use simple fixed-rule filtering to decide which new entries are to be added to the drop-down menu, and which new entries are the same as already existing entries and, therefore, should only cause the order of entries on the picklist section of the drop-down menu to be updated.

Further, some current applications, such as Pegasus mail for Windows, allow users to call up lists independently of any drop-down menu. As shown in FIG. 1A, when sending mail to a user in Pegasus mail, the user may either fill in the text box marked "To:" or select the question mark icon 31 to indicate that the user wishes to see a list of recently used addresses. Addresses may also be selected from an electronic address book, such as is shown in FIG. 1C, where full e-mail addresses are paired with equivalent aliases. In response to selecting the question mark icon 31, a recently used address list is displayed in a list box, as shown in FIG. 1B, complete with redundant, but not textually equivalent, entries. Since the user is not shown the list of names until after selecting the question mark icon, the user cannot see while using the screen of FIG. 1B whether the user wishes to remove any list entries. Also, since the list box contains redundant information, users may become confused as to which address is the proper address. It is desirable to overcome these deficiencies in known picklists and drop-down menus in computer graphical user interfaces (GUIs).

SUMMARY OF THE INVENTION

According to the present invention, a menu accessible in a GUI window includes a user-modifiable list of recently used references to particular objects, including but not limited to files or e-mail addresses. Further according to the present invention, the modifiable menu list is a pull, drop, or slide accessible Windows object. Further according to the present invention, an option on a drop-down menu activable in a GUI window permits deletion of entries from the list of recently used references. According to the present invention, a drop-down menu includes enhanced filtering capabilities to prevent redundant, but not textually equivalent, information from being added to the drop-down menu. Further according to the present invention, a computer system displays an adaptable drop-down redundancy reducing Windows feature preventing selected, not necessarily textually equivalent entries from being added to a drop-down menu. Thus, a picklist in a menu of a GUI Window is user-modifiable by permitting the user selectively to remove user-specified entries from the picklist section of the drop-down menu.

DETAILED DESCRIPTION OF THE PREFERRED EMBODIMENTS

Figure 2:
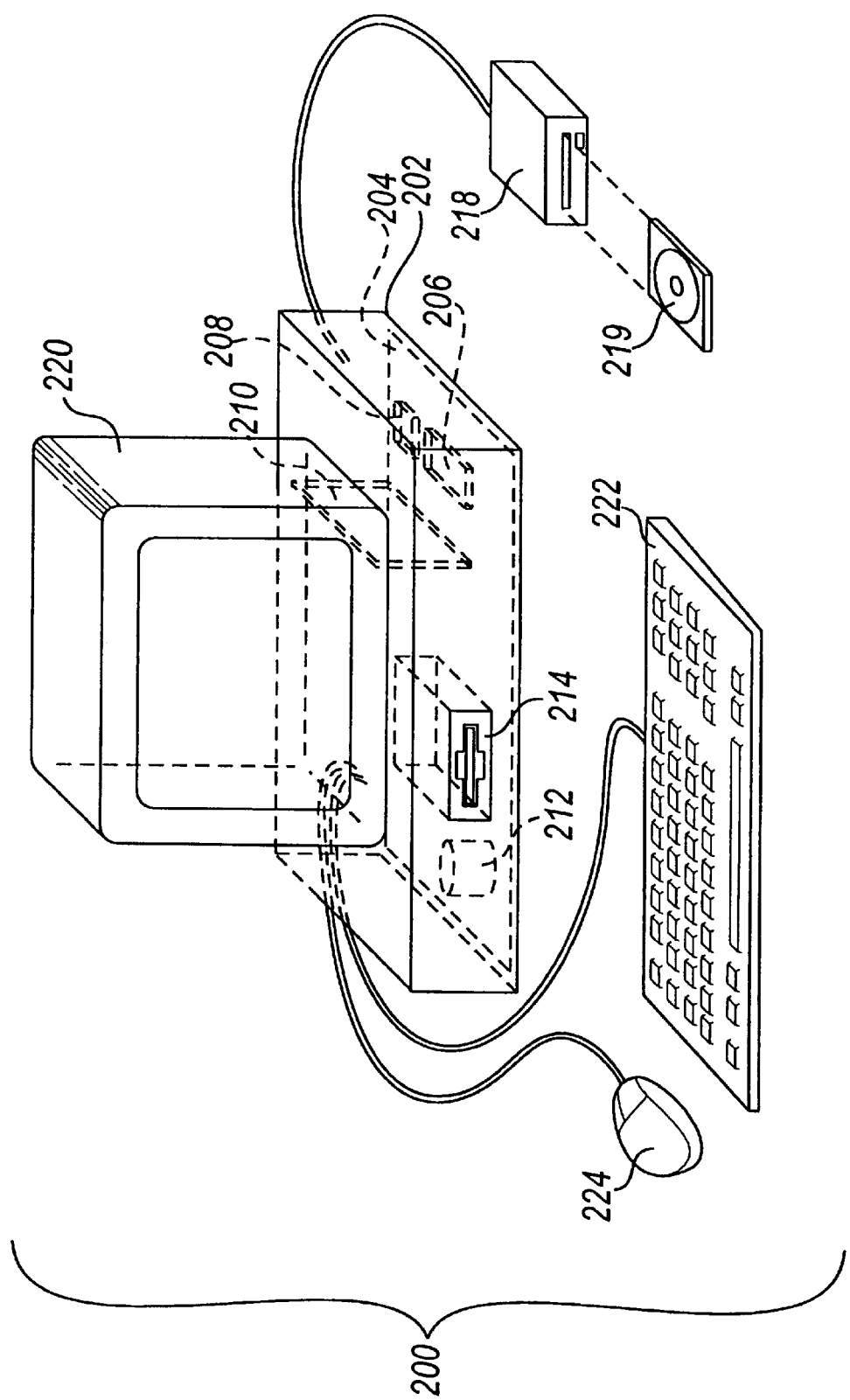
FIG. 2 is a schematic illustration of a current computer system for performing methods according to the present invention.

FIG. 2 is a schematic illustration of a conventional computer system 200 for displaying, editing and controlling picklist according to the present invention. Computer system 200 particularly includes a computer housing 202 containing a motherboard 204 holding a central processing unit (CPU) 206, a memory 208 a display card 210, a hard disk 212, and a floppy disk drive 214. Computer systems 250 further includes a compact disk drive 218, a selected medium 219, a monitor 220, and a plurality of input devices including but not limited to a keyboard 222 and a mouse 224. Display card 210 controls monitor 220. Computer system 200 further may include other removable media devices such as recording tape, and removable magneto-optical media (not shown), and other fixed, high density media drive materials. Hard disk 212 and floppy disk drive 214 are interconnected using an appropriate device bus, e.g., a SCSI bus or an Enhanced IDE bus. Computer system 200 additionally includes a compact disc reader writer 218 and a compact disc jukebox (not shown). In addition, computer system 200 includes a printer (not shown) to provide printed picklists. Stored on a selected computer readable medium, the software according to the present invention is configured to control both the hardware of the computer 200 and to enable computer system 200 to interact with a human user. Such software may include, but is not limited to, device drivers, operating systems and user applications, such as development tools. Such a computer readable medium further includes computer program products according to the present invention for displaying, editing, and controlling picklists of a graphical user interface (GUI) of a selected computer.

Figure 3:
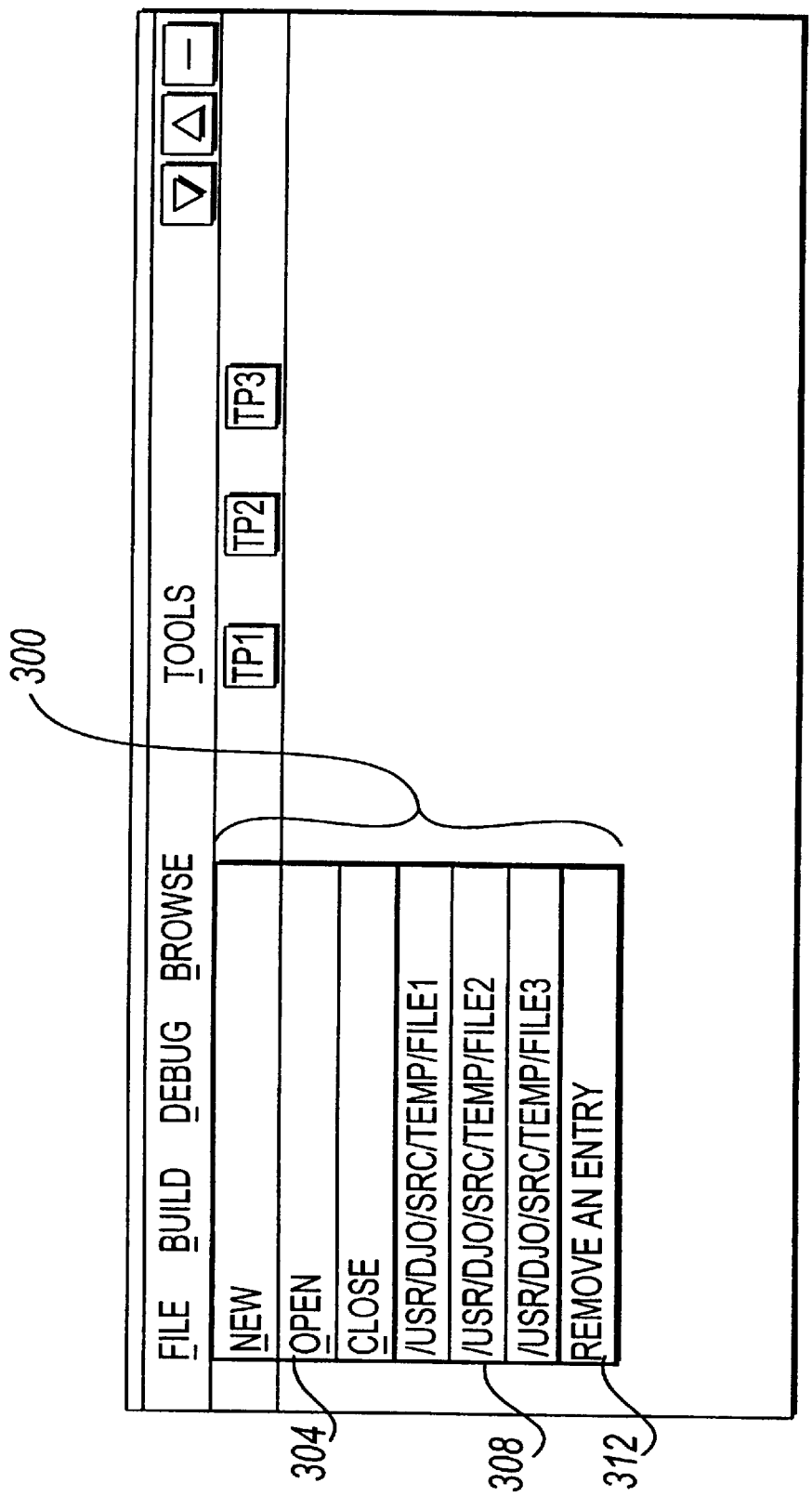
FIG. 3 is a schematic illustration of a Windows system which displays a file picklist section in a drop-down menu of a graphical user interface (GUI) before removal of a specified entry.

FIG. 3 shows a graphical user interface (GUI) 290 including a drop-down menu 300 displayed thereupon. Drop-down menu 300 as shown is a "File" style drop down menu which includes a command section 304, a picklist section 30, and a remove option section 312. In FIG. 3, the region of command section 304 is static and non-user alterable. By activating selected entries in command section 304, a user can initiate selected applications including creation of a new file, opening an existing file, and closing a current active file. Additional entries which may be found within command section 304 include, but not necessarily found, are commands for saving a current file, commands for printing a current file, commands for setting up a printer, commands for defining preferences, and commands for quitting a particular application. Picklist section 308 includes a display region showing three recently used files that have been opened or saved recently, i.e., "/user/djo/src/temp/src/file1," "/user/djo/src/temp/src/file2," and "/user/djo/src/temp/src/file3." Remove option section 312 includes a command for removing entries in picklist section 30.

Figure 1A:
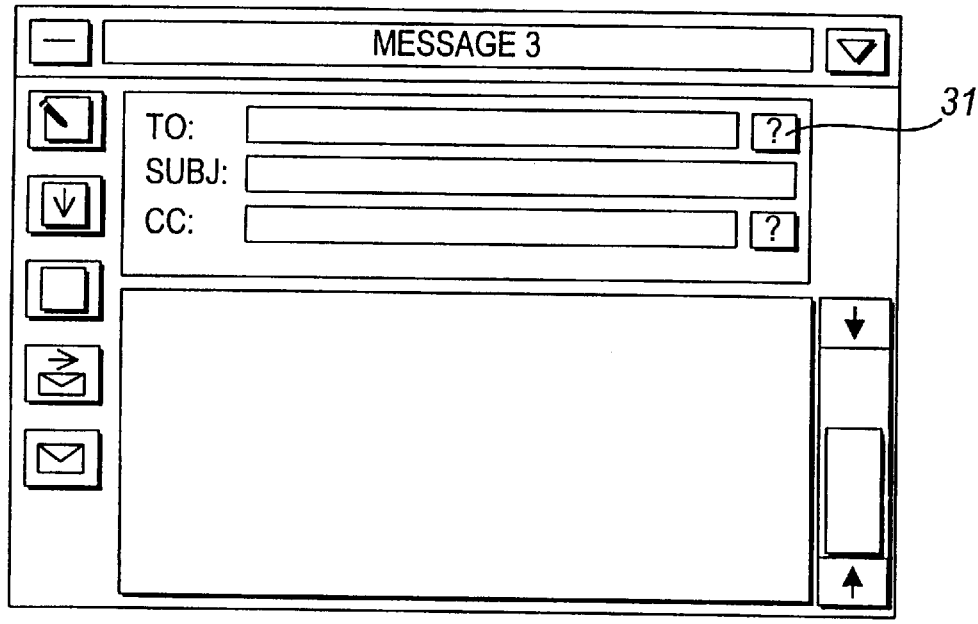
FIGS. 1A–1C are conventional graphical user interface (GUI) screen prints taken of a known windows interface system according to the prior art, which provides lists of recently used e-mail addresses and address books from which a user can choose desired items for activation.
Figure 1B:
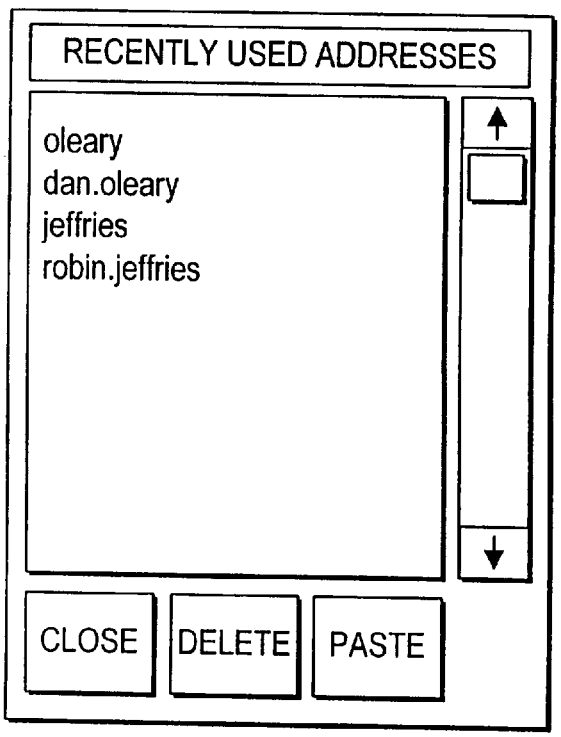
Figure 1C:
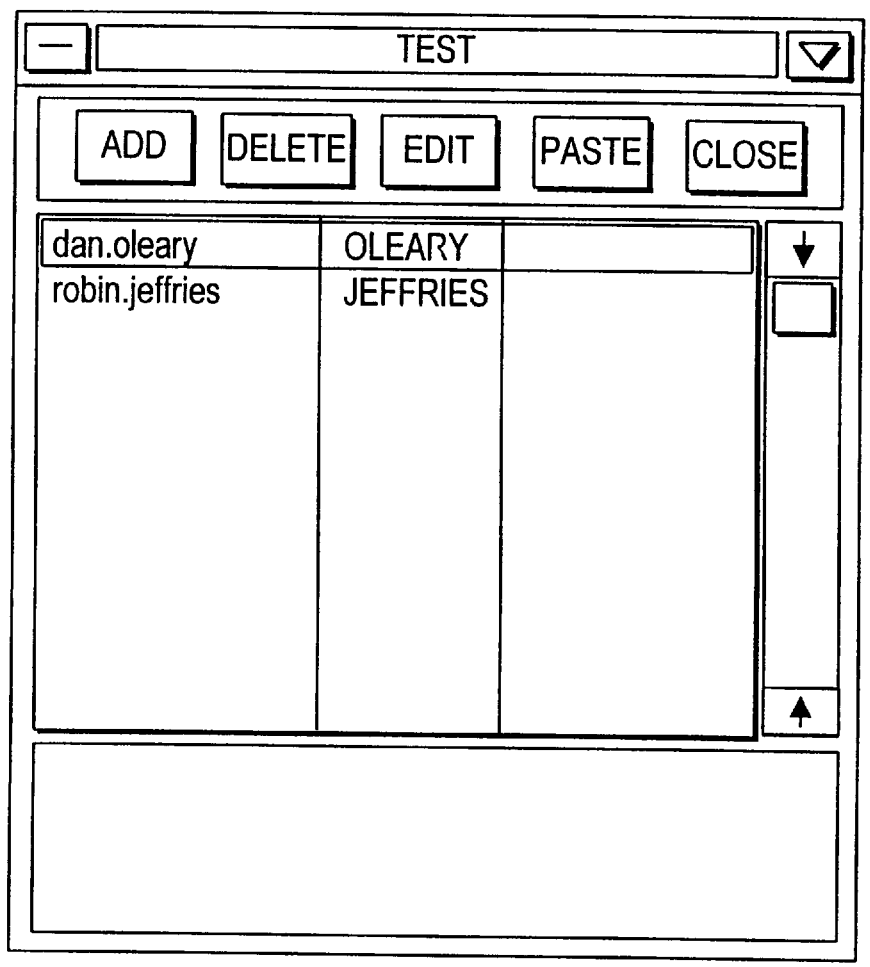
Figure 4:
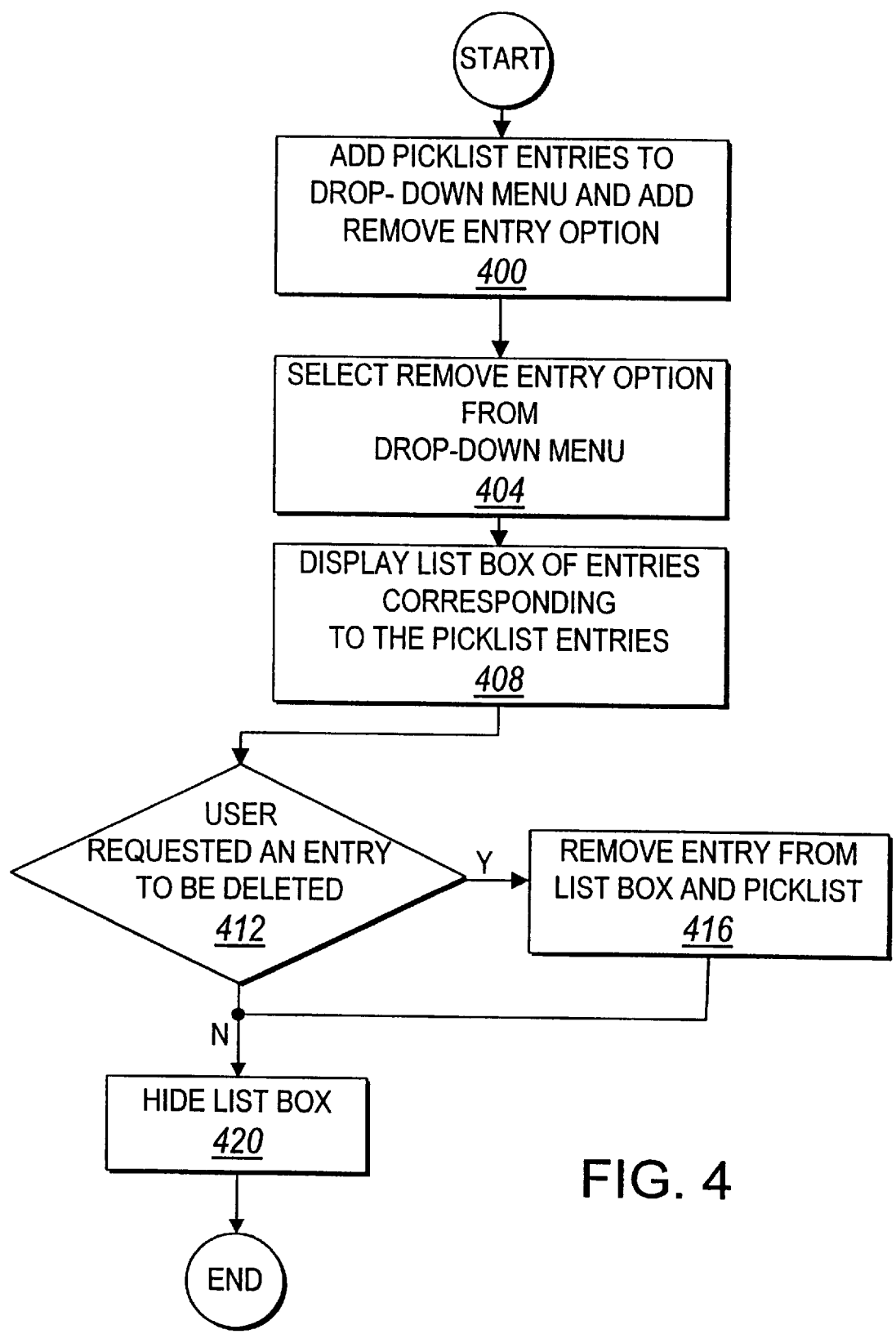
FIG. 4 is a flowchart of a method according to the present invention for removing an entry from a picklist section in a drop-down menu in a graphical user interface (GUI)
Figure 5:
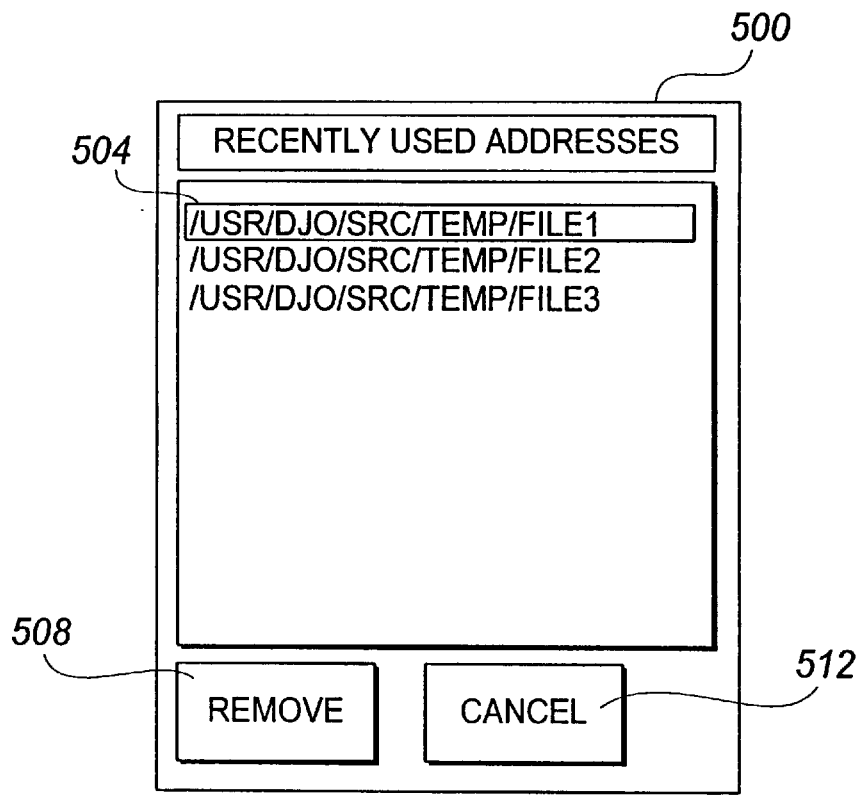
FIG. 5 is a diagram of a Windows list box in a graphical user interface (GUI) which contains entries from the picklist section, according to FIG. 3.
Figure 7:
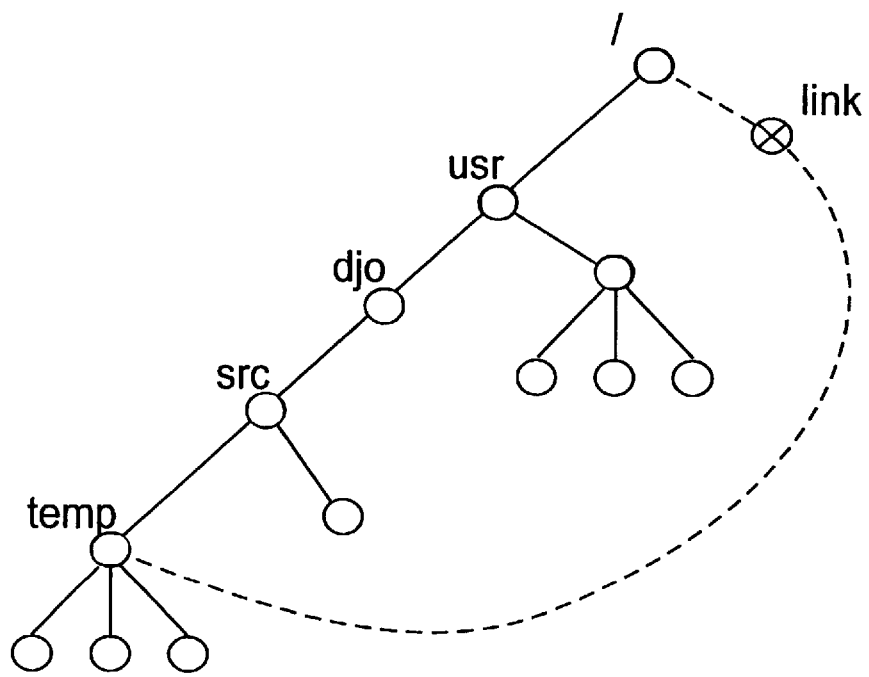
FIG. 7 is a schematic illustration of an exemplary file hierarchy in a UNIX-style file system.
Figure 6:
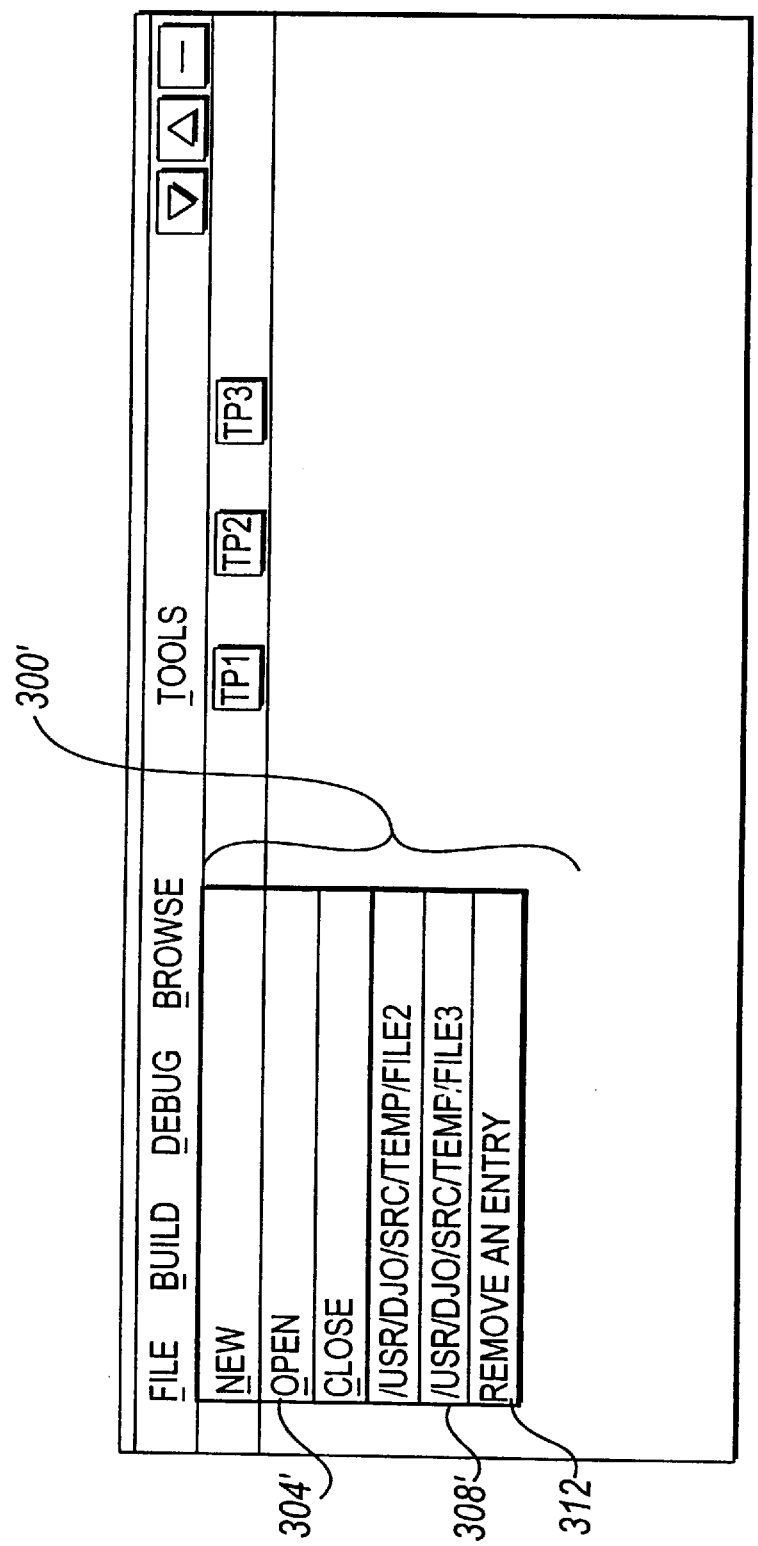
FIG. 6 is a schematic illustration of a system which displays a file picklist section of a drop-down menu after an entry is removed.
Figure 8:
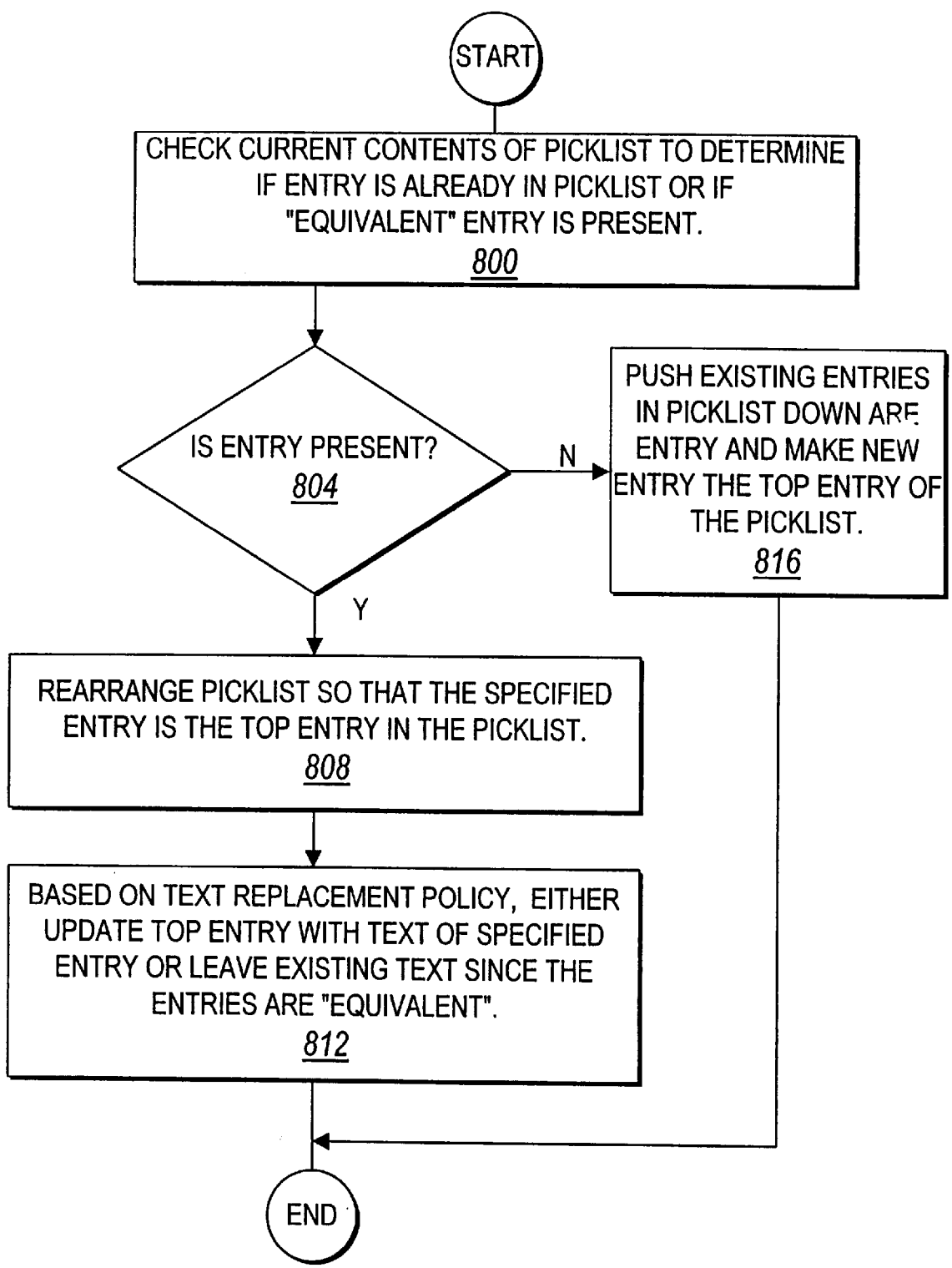
FIG. 8 is a flowchart showing a method for determining if a new entry is redundant with respect to an existing entry even though not textually equivalent.

FIG. 4 is a flowchart showing a method according to the present invention for removing entries from picklist section 30 in a drop-down menu 300. According to step 400, a drop-down menu 300 is constructed to include a command section 304 and picklist section 308, and a remove option section 312. According to step 404, a user selects remove option section 312, and a list box 500 similar to the list box shown in FIG. 5, is displayed or appears according to step 408. Alternatively a side menu appears next to section 312 detailing candidates for election. According to step 412, a determination is made whether the user desires 1) to select an entry within list box 500 and to remove an entry, e.g., entry 504, by selecting a remove button 508, or 2) to cancel the request to remove an entry by selecting a cancel button 512. Using file drop-down menu 300 shown in FIG. 3, if according to step 412 it was determined to select file entry 504 and activation of remove button 508, the process continues with step 416 according to the present invention. According to step 416, corresponding file entry, i.e., 504, is removed from "File" drop-down menu 300, resulting in a modified "File" drop-down menu 300' as shown in FIG. 6. Modified "File" drop-down menu 300' contains only the remaining two file entries of a the modified picklist section 308'. Subsequently, in step 420, list box 500 disappears or is hidden after performance of steps 412 and 416. The user can accordingly control the number of entries in a picklist section 308 of drop-down menu 300. Other kinds of menus can be employed whether in a windows environment or not. Further according to one embodiment of the present invention, automatic filtering is performed to reduce the number of entries appearing in picklist section 308. As shown in connection with FIG. 1B, certain known systems include redundant, not textually equivalent entries, causing user confusion, annoyance, and mistakes. As is shown in FIG. 7 with reference to a common UNIX file system, users can create symbolic links to other directories or files. FIG. 7 shows a symbolic directory indicated by an encircled "X". Directories indicated by filled circles, and files are indicated by hollow circles. In FIG. 7, two directories are shown as direct descendants of the root directory. The "usr" directory and the "link" symbolic directory both can be reached directly from the root directory. Since the directory "/link" is actually a symbolic directory, "/link/file1" is actually a shorthand reference to "/user/djo/src/temp/file1." In light of the potential for redundant file names in picklist section 30, entries are filtered in accordance with the present invention, before they are added to picklist section 308. The general process of filtering is described with reference to the flowchart of FIG. 8 in terms of filtering file names. When a file name is considered for addition to file picklist section 308, a method according to the present invention determines whether or not the "new" entry candidate already belongs to picklist section 308. To determine if a new file entry is already actually present, any symbolic links in the candidate file name are expanded to their full path names. The resulting expanded file name is then compared with the entries already present in the picklist section 308. If according to step 804, it has been determined that the resulting expanded candidate file name already exists in picklist section 308, then according to the present invention continues with step 808. Accordingly, the entries in picklist section 308 are rearranged to have the resulting expanded file name to the top of the list. The remaining file name entries are rearranged in light of the repositioning of the new top entry. As will be described below, depending on the selected implementation, a new top entry is either left in the form of original text to which the new top entry is "equivalent," or the text of the "equivalent" top entry replaces the original text. However, if according to step 804 a determination is made that the new entry or the resulting expanded name is not already present in the picklist section 308, the other entries are each moved down a space and the new entry in the form of the resulting expanded name is added to top of picklist section 308. The same process can be repeated for other types of objects or data, where data is redundant without actually being textually equivalent. For example, as was shown in FIG. 1B, both "oleary" and "dan.oleary" are equivalent addresses, even though they are not textually equivalent. When using a mail alias file, e.g., the ".mailrc" file in UNIX or an address book in Pegasus mail, the application according to the present invention expands aliases according to one embodiment and compares them with the results of full e-mail addresses in the picklist section 308, or the application shortens the address for which an alias exists and compare the shortened addresses with other aliases in picklist section 308. Either method results in storing only one entry per pairing of alias and full e-mail pairs.

The following code provides an example of how to perform filtering according to the present invention:

```
Class Picklist {
<tab> Picklist ( );
    .
    .
    .
    Int add Entry (String entry);
    remove Entry (String entry);
    Int already Present (String entry);
    display Remove Dialog ( );
};
    class file Picklist : public Picklist[
        file Picklist ( );
        .
        .
        .
        int already Present (String entry);
};
    class email Picklist : public Picklist{
        email Picklist ( );
        .
        .
        .
        Int already Present (String entry);
};
```

In particular, a base class, e.g., "Picklist," in the above code is utilized to implement a base functionality for all picklists. Sub-classes, e.g., "filePicklist" and "emailPicklist," can accordingly derive a majority of their functionality from the base class. In the base class, the method "int alreadyPresent (String entry)" implements the functionality of determining whether or not there is already a "String" in the picklist section 308 contents which are equivalent to the string contained in the variable "entry." In the base class, this functionality is performed using a standard "strcmp( )" function which tests for exact textual equivalence. However, the sub-classes, e.g., "filePicklist" and "emailPicklist," do not derive their implementations of "alreadyPresent( )" from "pickList" since they both can determine that two file names or two e-mail addresses, respectively, are equivalent in effect, although not textually equivalent. The method "alreadyPresent( )" is implemented to return the index of the entry in the picklist section 308 that is "equal" to the entry passed as an argument, or the method can return an identifier indicating that the picklist section 30 does not contain an "equivalent" entry.

Once the sub-classes have implemented "alreadyPresent( )," the base class implementation of "addEntry( )" can either add new entries or bring an already existing entry to the top of the list by determining whether the entry is "alreadyPresent( )," and, if not, by adding the entry. In this way, sub-classing provides an ability for intelligent picklist sections 308 to be built while minimizing the amount of new code that has to be written. Further new picklist sections 308 will accordingly be able to utilize a remove option section of the "picklist" base class according to the present invention wile allowing a user to see particular entries in a picklist section 308 before deciding to remove the entry. In this way, the remove operation is actually an operation on the drop-down menu 300 itself.

Although described above in terms of file filters and e-mail filters, the present invention also encompasses using "intelligent" picklists to filter out any type of information which can be determined to be redundant, even though not textually equivalent. For example, when using the "make" utility in UNIX, the make utility will "make" a first target in the make file, if no target is explicitly specified. Therefore, a "makePicklist" could implement "alreadyPresent( )" to determine if a specified build directory, make file, and target are equivalent to an entry that already exists in the picklist section 308 which contains the same build directory and make file, but does not contain a target. The entries are equivalent, if the specified target was the default target of the make file. Therefore, the new entry would not have to be added. Instead, the corresponding entry is moved to the top.

Further, depending on the desired look of the picklist section 308, the text of a corresponding top entry is replaced with a new entry, so that a user can more easily recognize equivalent entries, or te original text can be left. Similarly, particular sub-classes could also contain methods so that the text of the more specific of the two entries is used. This helps to avoid misidentifying entries by using the shorter notation. For example, by always converting "oleary" to "dan.oleary," the detrimental impact of the introduction of a new user "fred.oleary" is avoided. Similarly, if the target of a symbolic link "/link" of FIG. 6 were modified in accordance with the present invention by requiring use exclusively of the expanded file name, identification of the proper file is ensured. The same procedure could be used with make files. Since the default target to build is updated by rearranging entries in the make file, storing a more specific entry eliminates ambiguities, although it also limits flexibility. Consequently, in accordance with the present invention, a less specific entry is stored as a corresponding top entry. In the case of make files, a target is accordingly changeable while still maintaining the prior entry in the picklist section 308, causing only the internals of the make file to be updated.

In addition, although described above in terms of picklist sections 308 in drop-down menus 300, the present invention is applicable as well to other types of menus, e.g., pull-right and pull-left menus. Therefore, the term "menu" is intended to be a collective term for all types of menus.

Obviously, numerous modifications and variations of the present invention are possible in light of the above teachings. It is therefore to be understood that, within the scope of the appended claims, the invention may be practiced otherwise than as specifically described herein.

What is claimed is:

1. A computer implemented method of controlling a file drop down menu in a graphical user interface, comprising:

providing a mechanism for generating a file drop down menu having a picklist section displaying recently accessed files; and providing within the File drop down menu, a command for optionally removing an entry in the picklist.

2. The method according to claim 1, including displaying at least one entry of the picklist section of the menu in a separate window and displaying at least one entry of the picklist section of the menu in a list box.

3. The method according to claim 1, wherein adding at least one entry to the picklist section of the menu comprises:

adding to the picklist section of the menu a first reference comprising at least one entry;

determining if a first reference is equivalent to any other of the entries of the picklist;

blocking addition of said at least one entry if said at least entry is equivalent to any other item on said picklist; and adding the at least one new entry to the picklist section if the new entry is not equivalent to any other of the at least one entry.

4. The method according to claim 3 including determining whether a new entry is equivalent to any other of at least one entry even though the new entry is not textually equivalent to any other of the at least one entry.

5. The method according to claim 1, including displaying said at least one entry of the picklist section in a separate Window.

6. A computer program product comprising a computer storage medium and a computer program code mechanism embedded in the computer storage medium for causing a computer to control a File drop down menu of a graphical user interface, the computer program code mechanism comprising:

a first computer code device configured to generate a File drop down menu having a picklist section displaying recently accessed files;

a second computer code device configured to add a file picklist item remove option to the File drop down menu;

a third computer code device configured to display the at least one entry of the file picklist section of the File drop down menu in a separate window when a user selects the file picklist item remove option of the menu; and a fourth computer code device configured to remove a selected one of the at least one entry from the file picklist section of the File drop down menu in response to selection of a file picklist item in said separate window.

7. The computer program product according to claim 6, wherein said third computer code device is configured to display at least one entry of the file picklist section of the File drop down menu.

8. The method of removing a picklist item in a menu of a graphical user interface comprising:

entering a File drop down menu having a plurality of file picklist items indicative of recently accessed files in a graphical user interface;

selecting one of the plurality of said file picklist items to be deleted; and activating direct removal of the selected item.

* * * * *